(12) United States Patent
Zhu (10) Patent No.: US 11,592,976 B2
(45) Date of Patent: Feb. 28, 2023

(54) PARAMETER ADJUSTMENT USING VEHICLE TOUCH SCREEN

(71) Applicant: THOUGHTWORKS SOFTWARE TECHNOLOGY (BEIJING) LIMITED CO., Dongcheng District Beijing (CN)

(72) Inventor: Chen Zhu, Shaa (CN)

(73) Assignee: THOUGHTWORKS SOFTWARE TECHNOLOGY (BEIJING) LIMITED CO., Dongcheng District Beijing (CN)

( * ) Notice: Subject to any disclaimer, the term of this patent is extended or adjusted under 35 U.S.C. 154(b) by 0 days.

(21) Appl. No.: 17/441,931

(22) PCT Filed: Jul. 26, 2019

(86) PCT No.: PCT/CN2019/097864
§ 371 (c)(1),
(2) Date: Sep. 22, 2021

(87) PCT Pub. No.: WO2020/191973
PCT Pub. Date: Oct. 1, 2020

(65) Prior Publication Data
US 2022/0164095 A1    May 26, 2022

(30) Foreign Application Priority Data
Mar. 22, 2019  (CN) .......................... 201910223761.6

(51) Int. Cl.
*G06F 3/04847*  (2022.01)
*B60K 37/06*    (2006.01)
(Continued)

(52) U.S. Cl.
CPC .......... *G06F 3/04847* (2013.01); *B60K 37/06* (2013.01); *G06F 3/0488* (2013.01);
(Continued)

(58) Field of Classification Search
CPC .... G06F 3/04847; G06F 3/0488; G06F 3/167; B60K 37/06
See application file for complete search history.

(56) References Cited

U.S. PATENT DOCUMENTS 10,503,264 B1 * 12/2019 Blachly ................... G06F 3/017
2009/0183100 A1 * 7/2009 Eom .................... G06F 3/04883
715/769
(Continued)

FOREIGN PATENT DOCUMENTS

| CN | 109947349 A    | 6/2019  |
|----|----------------|---------|
| WO | 2015010452 A1  | 1/2015  |
| WO | 2018188320 A1  | 10/2018 |

OTHER PUBLICATIONS

International Search Report for related International Application No. PCT/CN2019/097864; report dated Oct. 1, 2020; (3 pages).
(Continued)

*Primary Examiner* — Seth A Silverman
(74) *Attorney, Agent, or Firm* — K&L Gates LLP (57) ABSTRACT

Methods and systems are provided for adjusting parameters using a vehicle touch screen. In one embodiment, a method includes determining an initial touch position of an external touch operation when the external touch operation is detected. A movement trajectory and final disengagement position of the external touch operation may then be detected. The movement trajectory need not be limited to an area covered by a parameter adjustment control. The parameter adjustment control may then be adjusted to a final parameter value according to the initial touch position, the final disengagement position, and the movement trajectory.

14 Claims, 7 Drawing Sheets

(51) Int. Cl.
    *G06F 3/0488*    (2022.01)
    *G06F 3/16*      (2006.01)
(52) U.S. Cl.
    CPC ......... *G06F 3/167* (2013.01); *B60K 2370/111* (2019.05); *B60K 2370/113* (2019.05); *B60K 2370/115* (2019.05); *B60K 2370/1438* (2019.05); *B60K 2370/1468* (2019.05); *B60K 2370/1575* (2019.05); *B60K 2370/52* (2019.05); *B60K 2370/92* (2019.05)

(56) References Cited

U.S. PATENT DOCUMENTS

| | | | | |
|---|---|---|---|---|
| 2009/0327964 | A1* | 12/2009 | Mouilleseaux | G06F 3/04883 715/834 |
| 2013/0219340 | A1* | 8/2013 | Linge | G06F 3/04883 715/834 |
| 2014/0245226 | A1 | 8/2014 | Butscher | |
| 2015/0370427 | A1* | 12/2015 | Zhang | H04M 1/72469 715/835 |
| 2017/0308225 | A1* | 10/2017 | Baek | G06F 3/0488 |
| 2018/0143754 | A1* | 5/2018 | Niazi | B60K 37/06 |

OTHER PUBLICATIONS

Written Opinion for related International Application No. PCT/CN2019/097864; report dated Oct. 1, 2020; (5 pages).

* cited by examiner

PARAMETER ADJUSTMENT USING VEHICLE TOUCH SCREEN

CROSS-REFERENCE TO RELATED APPLICATIONS

The present application is a National Stage of International Application No. PCT/CN2019/097864, filed on Jul. 26, 2019, which claims the benefit of earlier filing date and right of priority to Chinese Application No. 201910223761.6, filed on Mar. 22, 2019, the contents of which are all hereby incorporated by reference herein in their entirety.

FIELD

The present invention relates to the technical field of motor vehicles, and in particular, to a method for parameter adjustment based on a vehicle touch screen and a vehicle touch screen implementing the same.

BACKGROUND

When a driver is operating a vehicle, it may be necessary for the driver to control various parameters within the vehicle. In the past, motor vehicle cockpits provided physical controls, such as knobs for the driver to use when adjusting such parameters. When using physical controls, a driver can find and manipulate the control without having to look at the control for too long. For example, the driver can rely on their sense of touch to find and operate the control, determine the result of their operation, and confirm that a target parameter adjustment has been achieved. However, such physical controls have disadvantages. For example, once installed in the cockpit, the shape and function of physical controls cannot be easily changed. Physical controls also always occupy the same amount of space in the cockpit regardless of whether the driver is using the controls. Therefore, modern vehicle cockpits have replaced many of these physical controls with multi-touch LCD screens (hereinafter referred to as touch screens). The advantage of touch screens as a control is that the content displayed and manipulated can be flexibly changed as needed in a given context.

Although touch screen controls can be flexibly changed as needed, their primary disadvantage is that the surface of the touch screen is flat and smooth, so it is impossible to provide tactile feedback during like a physical control. The driver typically cannot clearly determine the result of a parameter adjustment action without visually observing the controls. Therefore, the driver must look at the LCD screen when operating the parameters on the touch screen to adjust the parameters, which increases risks while driving.

SUMMARY

The present disclosure presents new and innovative systems and methods for adjusting parameters using a touch screen. In one embodiment, a method is provided comprising determining an initial touch position of an external touch operation when a parameter adjustment control on the vehicle touch screen detects the external touch operation; detecting a movement trajectory and a final disengagement position of the external touch operation, wherein the movement trajectory is not limited to an area covered by the parameter adjustment control on the touch screen, and wherein the final disengagement position is a position before the external touch operation leaves the vehicle touch screen along the movement trajectory; and adjusting the parameter adjustment control to a final parameter value according to the initial touch position, the final disengagement position, and the movement trajectory.

In another embodiment, the method further comprises calculating an initial angle value of a first angle formed by (i) a first line extending from a center of the parameter adjustment control to a preset reference point of the parameter adjustment control and (ii) a second line extending from the center of the parameter adjustment control to the initial touch position; calculating an intermediate angle value of a second angle formed by (i) a third line extending from the center of the parameter adjustment control to a touch location on the movement trajectory and (ii) the first line; obtaining an intermediate parameter value for the parameter adjustment control based on the initial angle value, the intermediate angle value, and the movement trajectory; calculating a final angle value of a third angle formed by (i) a fourth line extending from the center of the parameter adjustment control to the final disengagement position and (ii) the first line; and determining the final parameter value for the parameter adjustment control based on the initial angle value, the final angle value, and the movement trajectory.

In a further embodiment, the method further comprises indicating the intermediate parameter value by voice feedback.

In yet another embodiment, the shape of the parameter adjustment control comprises one or more of a circle with a complete circumference, a circle with an incomplete circumference, a ring with a complete circumference, and a ring with an incomplete circumference.

In a still further embodiment, the method further comprises indicating the final parameter value by voice feedback.

In another embodiment, a vehicle-mounted touch screen is provided comprising a position detection module configured to determine an initial touch position of an external touch operation when a parameter adjustment control on the vehicle touch screen detects the external touch operation; a movement detection module configured to detect a movement trajectory and a final disengagement position of the external touch operation, wherein the movement trajectory is not limited to an area covered by the parameter adjustment control on the touch screen, and wherein the final disengagement position is a position before the external touch operation leaves the vehicle touch screen along the movement trajectory; and a parameter adjustment module configured to adjust the parameter adjustment control to a final parameter value according to the initial touch position, the final disengagement position, and the movement trajectory.

In a further embodiment, the parameter adjustment module is further configured to calculate an initial angle value of a first angle formed by (i) a first line extending from a center of the parameter adjustment control to a preset reference point of the parameter adjustment control and (ii) a second line extending from the center of the parameter adjustment control to the initial touch position; calculate an intermediate angle value of a second angle formed by (i) a third line extending from the center of the parameter adjustment control to a touch location on the movement trajectory and (ii) the first line; obtain an intermediate parameter value for the parameter adjustment control based on the initial angle value, the intermediate angle value, and the movement trajectory; calculate a final angle value of a third angle formed by (i) a fourth line extending from the center of the parameter adjustment control to the final disengagement position and (ii) the first line; and determine the final parameter value for the parameter adjustment control based on the initial angle value, the final angle value, and the movement trajectory.

In yet another embodiment, the vehicle-mounted touch screen further includes a voice broadcast module for indicating the intermediate parameter value by voice feedback.

In a still further embodiment, the shape of the parameter adjustment control comprises one or more of a circle with a complete circumference, a circle with an incomplete circumference, a ring with a complete circumference, and a ring with an incomplete circumference.

In another embodiment, the vehicle-mounted touch screen further includes a voice broadcast module for indicating the final parameter value by voice feedback.

In yet another embodiment, a system is provided comprising a touch screen; a processor; and a memory storing instructions which, when executed by the processor, cause the processor to: display a parameter adjustment control on the touch screen; determine an initial touch position of an external touch operation when the parameter adjustment control on the touch screen detects the external touch operation; detect a movement trajectory and a final disengagement position of the external touch operation, wherein the movement trajectory is not limited to an area covered by the parameter adjustment control on the touch screen, and wherein the final disengagement position is a position before the external touch operation leaves the touch screen along the movement trajectory; and adjust the parameter adjustment control to a final parameter value according to the initial touch position, the final disengagement position, and the movement trajectory.

In a further embodiment, the memory stores further instructions which, when executed by the processor, cause the processor to calculate an initial angle value of a first angle formed by (i) a first line extending from a center of the parameter adjustment control to a preset reference point of the parameter adjustment control and (ii) a second line extending from the center of the parameter adjustment control to the initial touch position; calculate an intermediate angle value of a second angle formed by (i) a third line extending from the center of the parameter adjustment control to a touch location on the movement trajectory and (ii) the first line; obtain an intermediate parameter value for the parameter adjustment control based on the initial angle value, the intermediate angle value, and the movement trajectory; calculate a final angle value of a third angle formed by (i) a fourth line extending from the center of the parameter adjustment control to the final disengagement position and (ii) the first line; and determine the final parameter value for the parameter adjustment control based on the initial angle value, the final angle value, and the movement trajectory.

In a still further embodiment, the memory stores further instructions which, when executed by the processor, cause the processor to indicate the intermediate parameter value by voice feedback.

In another embodiment, the shape of the parameter adjustment control comprises one or more of a circle with a complete circumference, a circle with an incomplete circumference, a ring with a complete circumference, and a ring with an incomplete circumference.

In yet another embodiment, the memory stores further instructions which, when executed by the processor, cause the processor to indicate the final parameter value by voice feedback.

Compared with conventional techniques, the techniques discussed in the present disclosure have several advantages. First, when a user wants to adjust vehicle parameters, the user can quickly scan the position of the touch screen positioning control. Since the entire control area can be touched and the target area for each control is large, it is easier for the user to touch the finger onto the control. Next, after initiating the adjustment, a user only has to move their finger clockwise or counterclockwise to adjust the parameter. When doing this, the driver does not need to continue looking at the touch screen, but can instead rely on touch to adjust the parameter and determine an angle of movement and parameter adjustment. Moreover, even if the driver's finger moves away from the touch screen control, the system will continue to track the finger, so the driver does not have to look closely at the screen while driving to ensure that the finger does not move out of the control surface. When the finger rotation angle is consistent with a desired parameter adjustment, the driver can raise the finger to complete the parameter adjustment operation. These methods and systems can greatly reduce visual distraction of the user while operating the parameter adjustment control, so that the user can concentrate on, e.g., driving the vehicle. This technique can therefore improve driving safety and can be applied to any motor vehicle using a touch screen control.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

In order to more clearly illustrate the embodiments of the present invention or the technical solutions over the prior art, the drawings used in the embodiments or the description of the prior art will be briefly described below. It is apparent that the drawings in the following description are some embodiments of the present invention, and those skilled in the art can obtain other drawings based on these drawings without any creative work.

DETAILED DESCRIPTION

In order to make the objects, technical solutions and advantages of the embodiments of the present invention more clear, the technical solutions in the embodiments of the present disclosure are clearly and completely described in the following with reference to the accompanying drawings. After reviewing the present disclosure, it should be apparent to one skilled in the art that the particular described embodiments represent a subset of the embodiments contemplated by the present disclosure. All other embodiments obtained by those skilled in the art based on the embodiments described in the present disclosure without creative efforts are within the scope of protection of the present invention.

Figure 1:
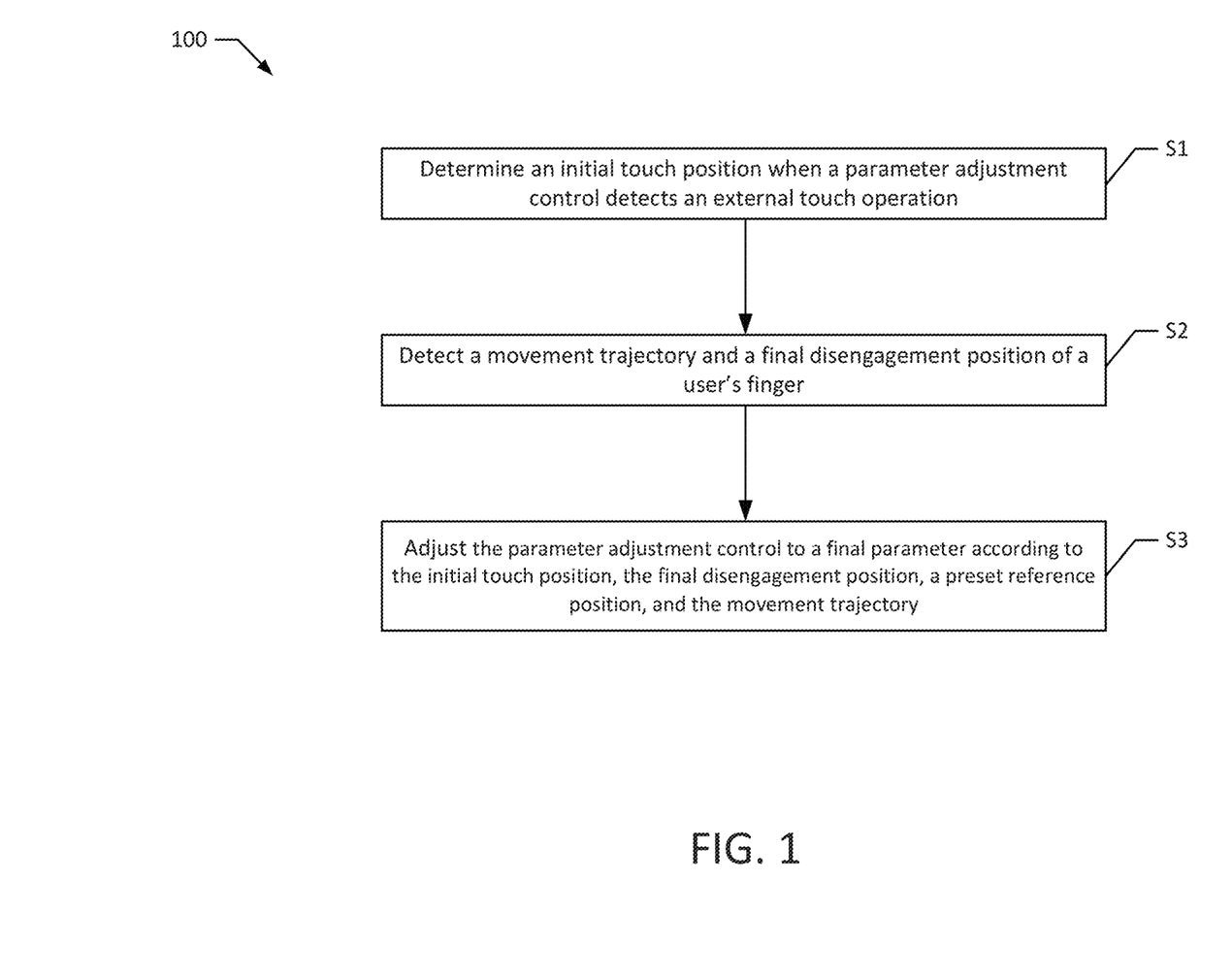
FIG. 1 depicts a flowchart of a method for parameter adjustment based on a vehicle touch screen according to an exemplary embodiment of the present disclosure.

As shown in FIG. 1, an embodiment of the present invention provides a method 100 for parameter adjustment based on a vehicle touch screen. The method 100 begins with determining an initial touch position when a parameter adjustment control on the touch screen detects an external touch operation (step S1). The method 100 proceeds with detecting a movement trajectory and a final disengagement position of a user's finger on the touch screen (step S2). Next, the method 100 includes adjusting the parameter adjustment control to a final parameter according to the initial touch position, the final disengagement position, a preset reference position, and the movement trajectory (step S3).

In certain implementations, step S3 may include calculating an initial angle value of an angle formed by a point at a center of the parameter adjustment control, a side of the initial touch position relative the center of the parameter adjustment control, and another side of the angle between the preset reference point and the line of the center (step N1). Next, step S3 may include calculating an apex at the center of the circle, an angle formed by the other side of the line connecting the position of the center of the trajectory to the center of the circle, and the angle between the preset reference point and the line connecting the center of the circle (step N2). Perform step S3 may then proceed with obtaining intermediate parameters based on the initial angle value, the intermediate angle value, and the direction of movement of the driver's finger (step N3) and calculating a final angle formed by the other side of an angle separating a line connecting the center of the position adjustment control with a line connecting the final reference point and the center of the circle (step N4). The final parameter may then be determined based on the initial angle value, the final angle value, and the direction of movement of the driver's finger (step N5).

In certain embodiments, the shape of the parameter adjustment control can be differently designed and different calculation methods can be applied for different adjustment situations, each of which is discussed below.

Situation 1: A Small Range of Continuous Parameters

A small range of continuous parameters may be useful for vehicle parameter adjustments such as setting the air conditioning temperature. In such situations, a total range of adjustable parameters may be small and specific values of the adjusted parameter may change continuously and are therefore difficult or impossible to list exhaustively.

Figure 2:
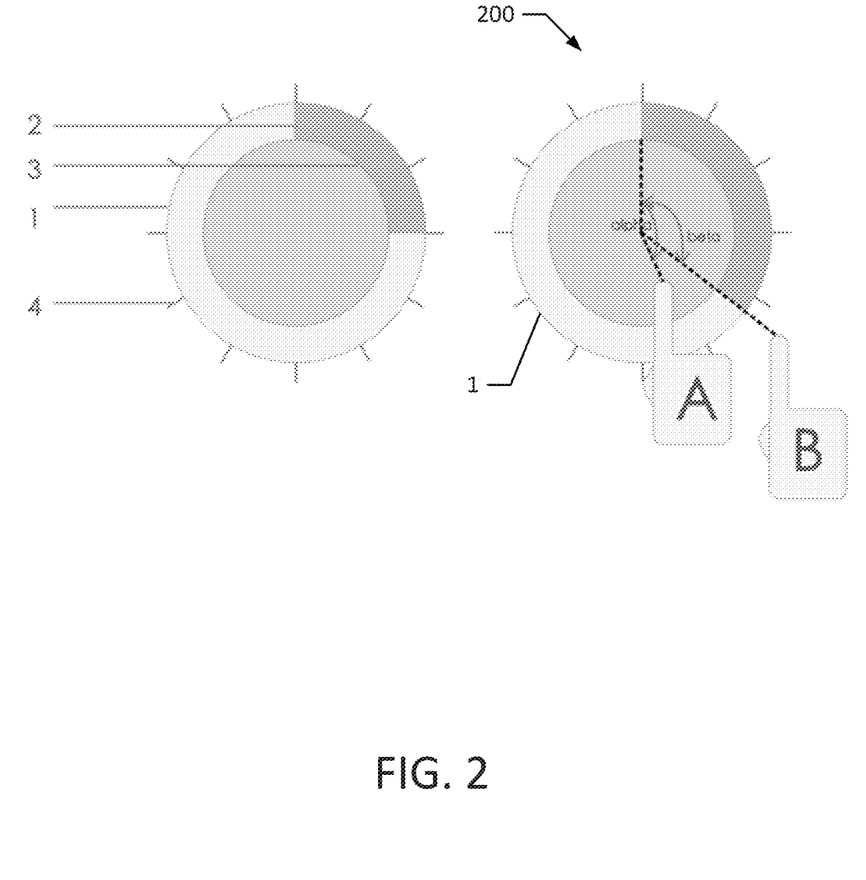
FIG. 2 is a schematic diagram of a parameter adjustment control for a small range of continuous parameters according to an exemplary embodiment of the present disclosure.

FIG. 2 depicts such a parameter adjustment control 1, which may be displayed on a touch screen in a vehicle. The circumference of the parameter adjustment control 1 may be used as an entire adjustable range of adjustable parameters. As depicted, the parameter adjustment control 1 is a 360° full circle, although partial circle implementations are also possible, as discussed below. The parameter adjustment control 1 includes an origin 2, which is depicted as the top of the parameter adjustment control, although any other position may be used as the origin in other implementations. The parameter adjustment control 1 also includes a ring 3 that indicates a current set value of the parameter. The width of the ring 3 may differ in other implementations, and, in certain implementations, the ring 3 can have a width as wide as be the radius of the parameter adjustment control 1. The origin 2 may act as an initial reference position against which the current position of the parameter adjustment control (indicated by the ring 3) is compared, although other methods can also be used to calibrate the current setpoint. The parameter adjustment control also includes scale markers 4 on the outer circumference. A value or icon can also be marked on the scale 4 so that the operator knows the parameter values corresponding to the respective positions on the circumference for the ring 3.

FIG. 2 also depicts an external touch operation 200 using the parameter adjustment control 1. Initially, the user (e.g., a driver) may touch the touch screen with a finger at position A. Upon touching the touch screen, the angle value alpha is calculated between the initial touch position A and a line connecting the center of the parameter adjustment control to the origin 2.

The user may then move their finger to a second position B. During this movement, the angle difference between the touch position of the user's finger and the origin is continuously detected. It may also be monitored whether the user's finger has moved out of a touch location of the parameter adjustment control 1 (e.g., the bounds of the parameter adjustment control 1. Even if the current touch position moves outside of the bounds of the parameter adjustment control 1, continuous tracking of the finger may be maintained so long as the current touch position remains on the touch screen. When the current touch position moves to position B, an angle beta is calculated between the position B and the line connecting the center of the parameter adjustment control and the origin 2.

After a change in the touch position is detected, a current parameter value may be calculated as:

Current parameter=(parameter adjustment range/total circumference angle)*beta+starting point parameter value represented by the origin Since the starting point is not always 0, the starting point parameter value represented by the origin is added to the calculation formula.

If the user's finger leaves the touch screen, the parameter adjustment process may end, and the control parameters controlled by the parameter adjustment control 1 may be set to the most-recently calculated current parameter value.

Situation 2: A Small Range of Discrete Parameters

A small range of discrete parameters may be useful for vehicle parameter adjustments such as setting an air conditioning outlet fan speed. In such situations, a total range of adjustable parameters may be small, and the possible values of the parameter can be listed exhaustively.

Figure 3:
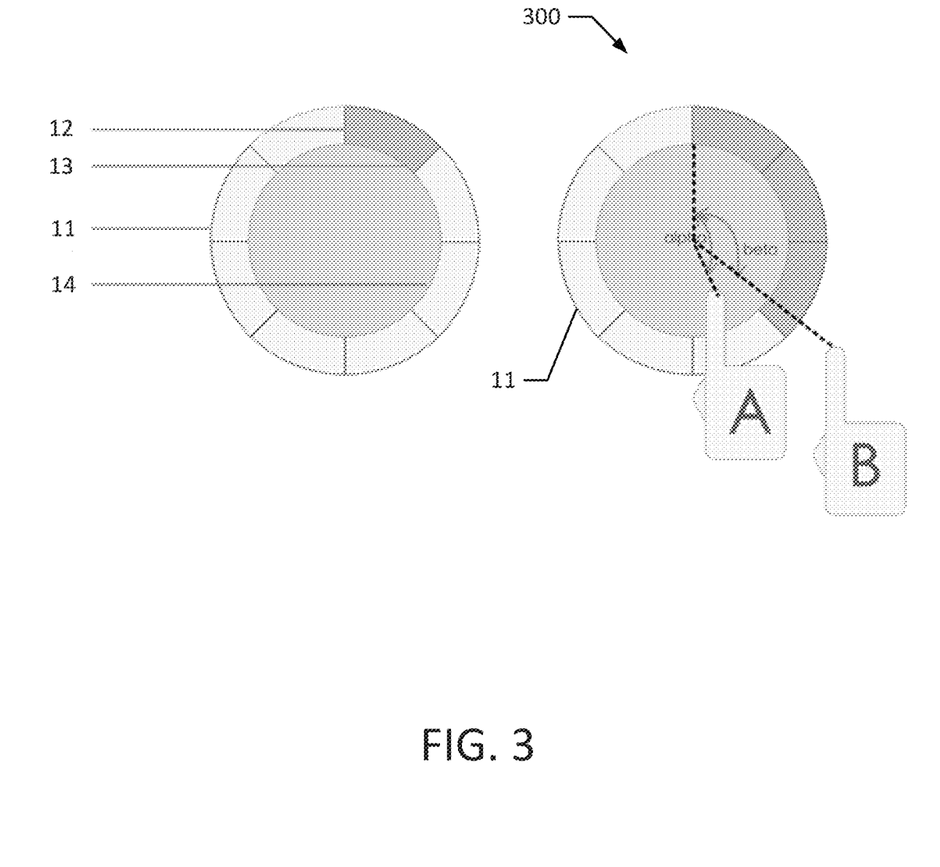
FIG. 3 is a schematic diagram of a parameter adjustment control for a small range of discrete parameter according to an exemplary embodiment of the present disclosure.

FIG. 3 depicts a parameter adjustment control 11, which may be displayed on a touch screen in a vehicle. The circumference of the parameter adjustment control 11 may be used as an entire adjustable range of adjustable parameters. As depicted, the parameter adjustment control 11 is a 360° full circle, although partial circle implementations are also possible, as discussed below. The parameter adjustment control 1 includes an origin 2, similar to the origin 2 of the parameter adjustment control 1. The parameter adjustment control 11 also includes a ring 13 that indicates a current set value of the parameter, whose width may differ similar to the ring 3. The parameter adjustment control 11 also includes an origin 12 that may act as an initial reference position against which the current position of the parameter adjustment control (indicated by the ring 13) is compared. The ring 13 is divided into a set number of parts according to the total number N of discrete parameter values. Reference number 14 identifies one such part of the ring 13. Numbers or legends can be included in the parameter adjustment control 11 to indicate the values for each position part 14 of the ring 13.

FIG. 3 also depicts an external touch operation 300 using the parameter adjustment control 11. Initially, the user (e.g., a driver) may touch the touch screen with a finger and at position A. Upon touching the touch screen, the angle value alpha is calculated between the initial touch position A and a line connecting the center of the parameter adjustment control to the origin 2.

The user may then move their finger to a second position B. During this movement, the angle difference between the touch position of the user's finger and the origin is continuously detected, regardless of whether the user's finger has moved out of a touch location of the parameter adjustment control 11. For every change in the angle that results in a new parameter value, the system may read the current parameter value (e.g., with auditory feedback) to indicate the current parameter value of the parameter adjustment control. When the current touch position moves to position B, an angle beta is calculated between the position B and the line connecting the center of the parameter adjustment control and the origin 12

After a change in the touch position is detected, the current parameter value may be calculated as:

Current parameter=pair (parameter adjustment range) *(beta/360°+X) rounded down+starting point parameter value represented by the origin Since the starting point is not always 0, the starting point parameter value represented by the origin may be added to the calculation formula. The rounding in the above formulation may result in discarding any decimals such that only integers are used for the current parameter value. X may represent a fraction between 0 and 1 and may be used to adjust the sensitivity of the parameter change.

If the user's finger leaves the touch screen, the parameter adjustment process may end, and the control parameters controlled by the parameter adjustment control 11 may be set to the most-recently calculated current parameter value.

Situation 3: A Wide Range of Continuous Parameters

A wide range of continuous parameters may be useful for vehicle parameter adjustments, such as setting the AM/FM radio frequency. In such situations a total range of adjustable parameters may be large enough that a 360° circumference such as the parameter adjustment control 1 is not enough to accurately adjust the parameter across the entire range. Further, since the potential values of the parameters are continuous, it may be difficult or impossible to exhaustively list all of the values.

Figure 4:
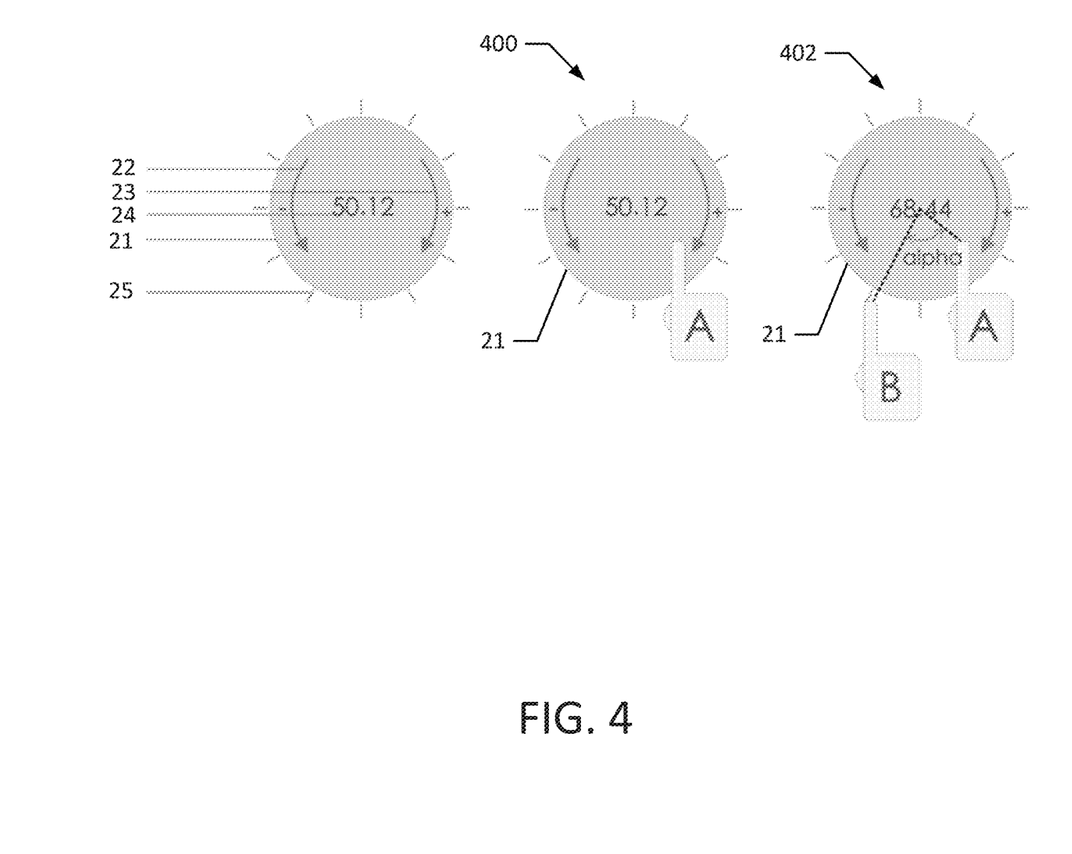
FIG. 4 is a schematic diagram of a parameter adjustment control for a wide range of continuous parameters according to an exemplary embodiment of the present disclosure.

FIG. 4 depicts a parameter adjustment control 21 for such situations, which may be displayed on a touch screen in a vehicle. The parameter adjustment control 21 includes markings 22, 23, that indicate to users how the parameters will change correspondingly when a touch location moves clockwise or counterclockwise. The parameter adjustment control 21 also includes an indication 24 of a current value of the parameter adjusted by the parameter adjustment control 21. The parameter adjustment control 21 also includes a scale 25 on its outer circumference, which may (although not depicted) include numerical values or a legend so that the operator knows the parameter change value corresponding to movement around the parameter adjustment control.

Since the adjustment range of the parameter is large, the 360° circumference of the parameter adjustment control 21 may not represent the entire adjustment range of the parameter as the parameter adjustment control 21. Therefore, when a touch location rotates clockwise or counterclockwise, the total degree of rotation can exceed 360°, and may continue to accumulate for each rotation around the parameter adjustment control 21. This angle is indicated across touching operations 400, 402 between positions A and B, and is represented by alpha.

The amount of change in the parameter is:

Parameter change amount=Alpha/360°*Preset parameter change value and angle value ratio The current parameter value may then be set to: the initial value of the parameter before adjustment+the amount of change of the parameter If the user's finger leaves the touch screen, the parameter adjustment process may end, and the control parameters controlled by the parameter adjustment control 1 may be set to the most-recently calculated current parameter value.

Situation 4: A Lame Range of Discrete Parameters

A large range of discrete parameters may be useful for vehicle parameter adjustments such as setting the month or day when setting a date. In such situations, the range in which the parameter can be adjusted is large enough that the circumference of 360° may not suffice to map the entire adjustment range. But, since the parameter values are discrete, after setting the starting point and focus of the settable range, it may be possible to exhaustively list all possible values of such parameters.

Figure 5:
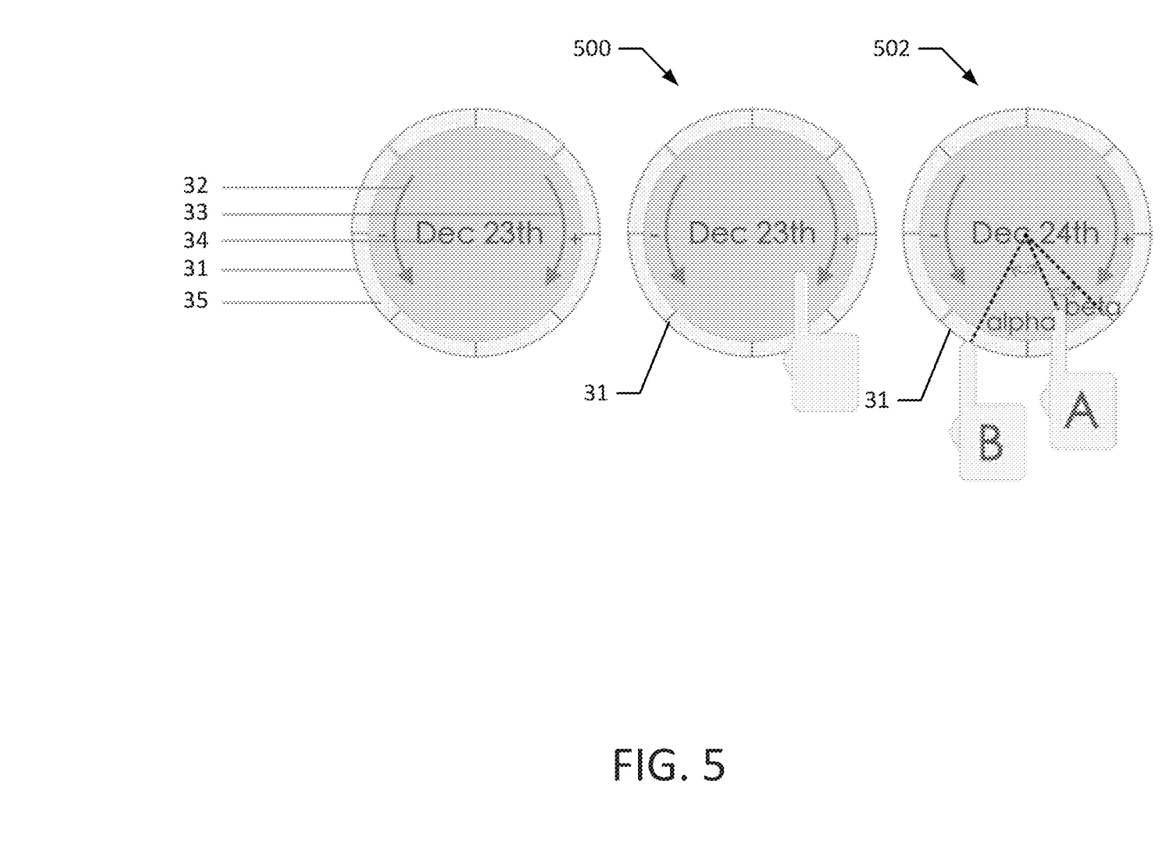
FIG. 5 is a schematic diagram of a parameter adjustment control of a large-scale discrete parameter according to an exemplary embodiment of the present disclosure.

FIG. 5 depicts a parameter adjustment control 31 for such situations, which may be displayed on a touch screen in a vehicle. The parameter adjustment control 31 includes markings 32, 33 that indicate to users how the parameters will change correspondingly when a touch location moves clockwise or counterclockwise. The parameter adjustment control 31 also includes an indication 34 of a current value of the parameter adjusted by the parameter adjustment controller 31. The parameter adjustment control 31 also includes a scale 35 on its outer circumference, which may represent a required movement angle required for each preset discrete value change.

Since the adjustment range of the parameter is large, the 360° circumference of the parameter adjustment control 31 may not represent the entire adjustment range of the parameter adjustment control 31. Therefore, when a touch location rotates clockwise or counterclockwise, the total degree of rotation can exceed 360°, and may continue to accumulate for each rotation around the parameter adjustment control 31. This angle is indicated across touching operation 500, 502 between positions A and B, and is represented by alpha and beta, with beta representing an angle value from a previous scale with the touch operation begins with an initial touch location at position A.

When the touch location moves from position A to position B, the change value of the parameter is:

Parameter change amount=pair (the parameter change amount per 360° *((Alpha+Beta)/360)°+ X) rounded down The current parameter value may then be set to: the initial value of the parameter before adjustment+the amount of change of the parameter. As with the parameter adjustment control 11, the rounding algorithm is such that any decimal is discarded, leaving only an integer value for the parameter adjustment. X may represent a fraction between 0 and 1 and may be used to adjust the sensitivity of the parameter change.

If the user's finger leaves the touch screen, the parameter adjustment process may end, and the control parameters controlled by the parameter adjustment control 11 may be set to the most-recently calculated current parameter value.

Parameter Adjustment Controls: Exemplary Embodiments

In certain implementations, the parameter adjustment controls 1, 11, 21, 31, may be represented by shapes such as a circle with a complete circumference, a circle with an incomplete circumference, a ring with a complete circumference, and a ring with an incomplete circumference.

Figure 6:
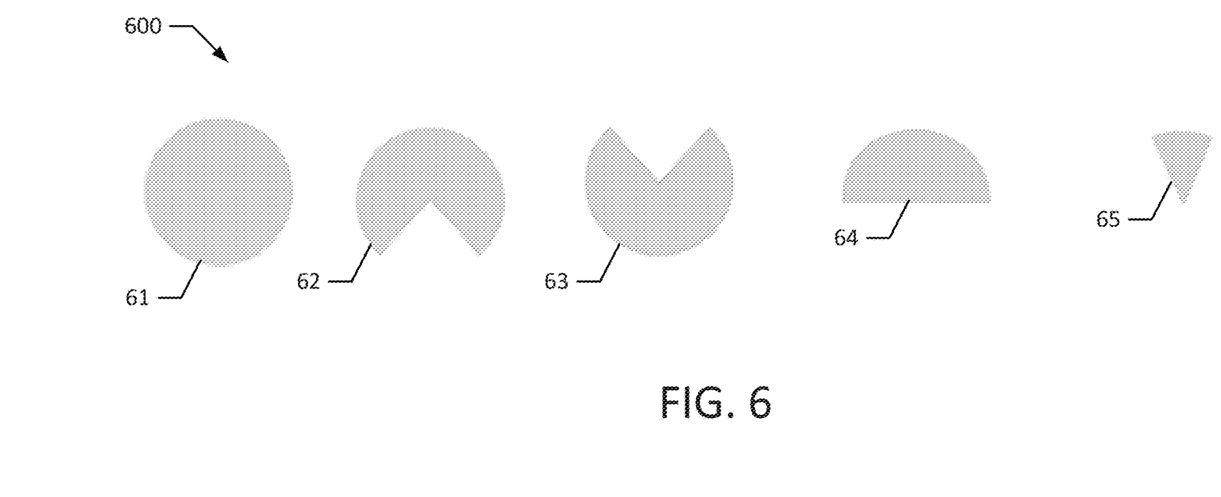
FIG. 6 is a schematic diagram showing the shape of a parameter adjustment control in a fan shape according to exemplary embodiments of the present disclosure.

For example, FIG. 6 depicts a plurality of circular shapes 600 which may be used for the parameter adjustment controls 1, 11, 21, 31. The circular shapes 600 include a circle 61 with a complete circumference and circles 62-65 with incomplete circumferences. When the parameter adjustment control 1, 11, 21, 31 is implemented as a circular shape 600, the start and end points of the rotation can be any angle on the circumference, and touching any part of the circle 60-65 may initiate an external touch operation.

Figure 7:
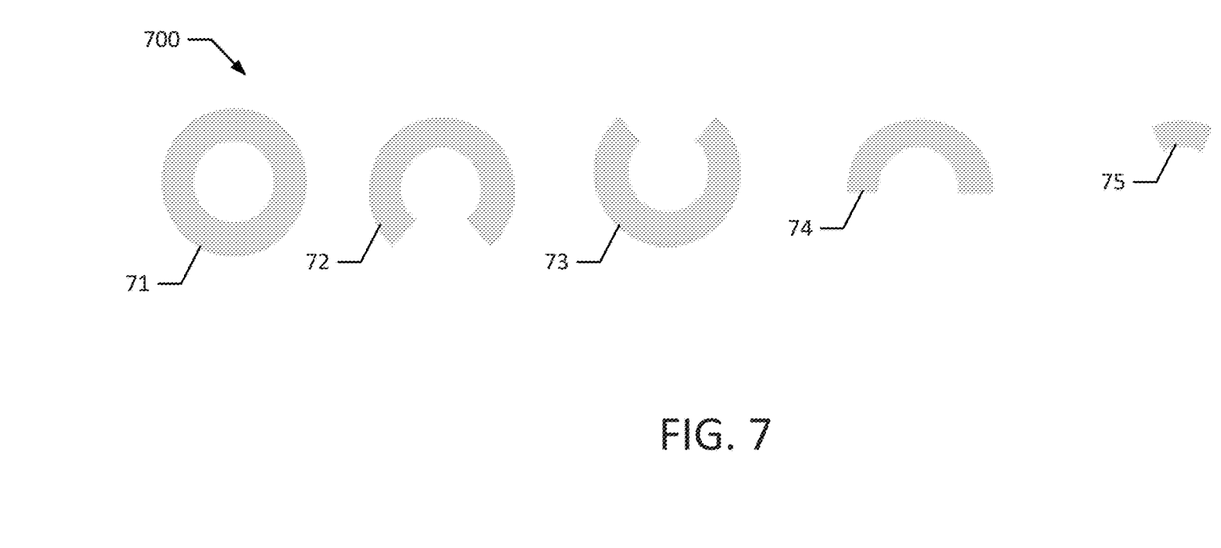
FIG. 7 is a schematic diagram showing the shape of a parameter adjustment control in a ring shape according to exemplary embodiments of the present disclosure.

As another example, FIG. 7 depicts a plurality of ring shapes 700, which may be used for the parameter adjustment controls 1, 11, 21, 31. The ring shapes 700 include a ring 61 with a complete circumference and rings 72-75 with incomplete circumferences. In certain implementations, when the parameter adjustment control 1, 11, 21, 31 is implemented as a ring shape 700, the touch response range may be limited to the area of the ring. For example, an external touch operation may not initiate for the parameter adjustment control 1, 11, 21, 31 if the initial touch location is empty middle portion of the ring shape 700. In certain implementations, this empty middle portion may include additional parameter adjustment controls (e.g., for controlling other parameters).

In an embodiment of the present invention, step N3 further includes providing vocal feedback of an intermediate parameter. In such embodiments, for the above two types of discrete parameter adjustment controls 11, 31, during the adjustment process, the current parameter value may be played once whenever the discrete parameter adjustment position changes. For the above two types of continuous parameter adjustment controls 1, 21, during the adjustment process, vocal feedback regarding the current parameter value may be played once whenever a touch position remains stationary for a certain period of time. In addition, if the touch position remains stationary for more than a period of time, vocal feedback regarding the current parameter value may be played once, and vocal feedback regarding the current parameter value can also be played again once the parameter value changes. Different types of auditory feedback may be used in different implementations.

In an embodiment of the present invention, after step S3, the method further includes playing vocal feedback regarding a final parameter.

In this embodiment, when a touch location moves starts to remain in place for a certain period of time, and/or the parameter remains unchanged for more than a predefined period of time, the system may read the current value aloud so that the user can understand the current parameter value without looking at the touch screen. In addition, when the parameter adjustment process is completed, vocal feedback regarding the final parameter value may read aloud to alert the driver to the final parameter value.

Figure 8:
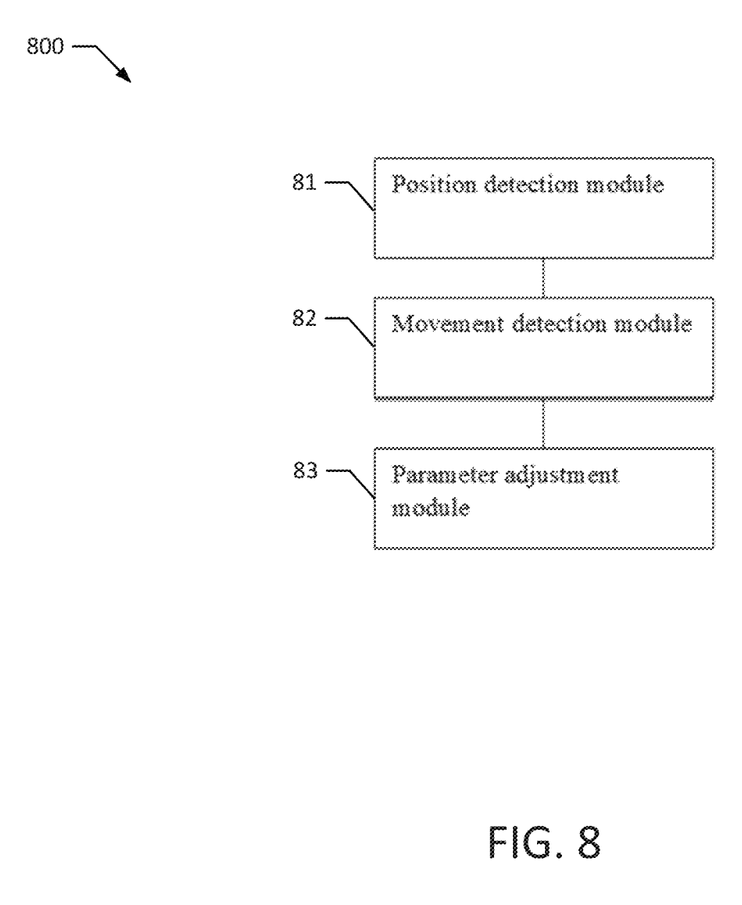
FIG. 8 is a block diagram of a vehicle touch screen system according to an exemplary embodiment of the present disclosure.

As shown in FIG. 8, an embodiment of the present invention provides a vehicle touch screen 800. The vehicle touch screen 800 includes a position detection module 81 configured to determine an initial touch position when an external touch operation is performed when the parameter adjustment control on the touch screen detects an external touch operation. The vehicle touch screen 800 also includes a movement detection module 82 configured to detect a movement trajectory of the driver's finger and a final disengagement position. The vehicle touch screen 800 also includes a parameter adjustment module 83 configured to adjust the parameter adjustment control to a final parameter according to an initial touch position, a final disengagement position, a preset reference position, and a movement trajectory.

In certain embodiments, in order to make the vehicle touch screen 800 more convenient to use, in addition to the above modules 81-83, vehicle touch screen 800 may include additional modules.

For example, in one embodiment, the parameter adjustment module 83 may itself include one or more calculation units. A first calculation unit may be configured to calculate the apex of the corner of the center of the parameter adjustment control 1, 11, 21, 31, the initial angle of the angle formed by the other side of the angle between the initial reference point and the line connecting the center of the parameter adjustment control 1, 11, 21, 31. A second calculation unit may be configured to calculate an intermediate angle formed by a vertex with an angle of a center of the parameter adjustment control 1, 11, 21, 31, and one side of the line connecting the position of the track to the center of the circle, and the other side of the line connecting the center of the preset reference point and the center of the parameter adjustment control 1, 11, 21, 31. A third calculation unit may be configured to obtain an intermediate parameter value according to an initial angle value, an intermediate angle value, and a moving direction of the touch location. A fourth calculation unit may be configured to calculate the apex at the center of the parameter adjustment control 1, 11, 21, 31, with the final angle value of the angle formed by the other side of the angle at which the line connecting the position of the center point and the center of the parameter adjustment control 1, 11, 21, 31 is the angle of the preset reference point and the line of the center of the parameter adjustment control 1, 11, 21, 31. A fifth calculation unit may be configured to determine a final parameter according to an initial angle value, a final angle value, and a moving direction of the touch location.

In one embodiment, the shape of the parameter adjustment control 1, 11, 21, 31 includes a circle with a complete circumference, a circle with an incomplete circumference, a ring with a complete circumference, and a ring with an incomplete circumference.

In another embodiment, said third calculation unit is further configured to broadcast audio feedback of the intermediate parameter value.

In a further embodiment of the invention, vehicle touch screen 800 further includes a voice broadcast module for playing the final parameter by voice.

The content of the information exchange, the parameter adjustment process, and the like between the modules 81-83 and other components of the vehicle touch screen 800 may be based on the above-discussed methods, including the method 100 and steps N1-N3.

It should be noted that, in this context, relational terms such as first and second are used merely to distinguish one entity or operation from another entity or operation, and do not necessarily require or imply any such actual relationship or order between these entities or operations. Furthermore, the terms "includes" or "comprises" or "comprises" or any other variation thereof is intended to cover a non-exclusive inclusion, such that a process, method, article, or device comprising a plurality of elements includes not only those elements but also other elements not specifically listed, or it also includes elements inherent to such a process, method, article or device. An element defined by the phrase "includes a . . . ", without further limitation, does not exclude the presence of additional equivalents in the process, method, article, or device that comprises said element.

Those with ordinary skill in the art can understand that all or part of the steps of implementing the foregoing method embodiments may be performed by hardware related to computer program instructions. The foregoing program instructions may be stored in a computer readable storage medium, and when executed by a processor, the instructions include the steps of the above-discussed methods. Such storage media may include various media that can store program code, such as read-only memory (ROM), random access memory (RAM), disks, optical disks, etc.

The above description focuses primarily on preferred embodiments of the present invention and is only used to explain the technical solutions of the present invention. The description is therefore not intended to limit the scope of the present invention. Any modifications, equivalents, improvements, etc. made within the spirit and scope of the invention are intended to be included within the scope of the invention.

What is claimed is:

1. A method for parameter adjustment based on a vehicle touch screen, the method comprising:
   determining an initial touch position of an external touch operation when a parameter adjustment control on the vehicle touch screen detects the external touch operation;
   calculating an initial angle value of a first angle formed by (i) a first line extending from a center of the parameter adjustment control to a preset reference point of the parameter adjustment control and (ii) a second line extending from the center of the parameter adjustment control to the initial touch position;
   detecting a movement trajectory and a final disengagement position of the external touch operation, wherein the movement trajectory is not limited to an area covered by the parameter adjustment control on the touch screen, and wherein the final disengagement position is a position before the external touch operation leaves the vehicle touch screen along the movement trajectory;
   calculating an intermediate angle value of a second angle formed by (i) a third line extending from the center of the parameter adjustment control to a touch location on the movement trajectory and (ii) the first line;
   obtaining an intermediate parameter value for the parameter adjustment control based on the initial angle value, the intermediate angle value, and the movement trajectory;
   calculating a final angle value of a third angle formed by (i) a fourth line extending from the center of the parameter adjustment control to the final disengagement position and (ii) the first line;
   determining a final parameter value based on the initial angle value, the final angle value, and the direction of the movement trajectory; and
   adjusting the parameter adjustment control to the final parameter value.

2. The method for parameter adjustment based on the vehicle touch screen of claim 1, further comprising indicating the intermediate parameter value by voice feedback.

3. The method for parameter adjustment based on the vehicle touch screen of claim 1, wherein the shape of the parameter adjustment control comprises one or more of a circle with a complete circumference, a circle with an incomplete circumference, a ring with a complete circumference, and a ring with an incomplete circumference.

4. The method for parameter adjustment based on the vehicle touch screen of claim 1, wherein the method further comprises indicating the final parameter value by voice feedback.

5. A vehicle-mounted touch screen comprising:
   a position detection module configured to determine an initial touch position of an external touch operation when a parameter adjustment control on the vehicle touch screen detects the external touch operation;
   a movement detection module configured to detect a movement trajectory and a final disengagement position of the external touch operation, wherein the movement trajectory is not limited to an area covered by the parameter adjustment control on the touch screen, and wherein the final disengagement position is a position before the external touch operation leaves the vehicle touch screen along the movement trajectory; and
   a parameter adjustment module configured to:
      control to a final parameter value according to the initial touch position, the final calculate an initial angle value of a first angle formed by (i) a first line extending from a center of the parameter adjustment control to a preset reference point of the parameter adjustment control and (ii) a second line extending from the center of the parameter adjustment control to the initial touch position;
      calculate a final angle value of a third angle formed by (i) a third line extending from the center of the parameter adjustment control to the final disengagement position and (ii) the first line;
      determine a final parameter value for the parameter adjustment control based on the initial angle value, the final angle value, and the movement trajectory; and
      adjust the parameter adjustment control to the final parameter value.

6. The vehicle-mounted touch screen of claim 5, wherein the parameter adjustment module is further configured to:
calculate an intermediate angle value of a second angle formed by (i) a third fourth line extending from the center of the parameter adjustment control to a touch location on the movement trajectory and (ii) the first line; and
obtain an intermediate parameter value for the parameter adjustment control based on the initial angle value, the intermediate angle value, and the movement trajectory.

7. The vehicle-mounted touch screen of claim 6, wherein the vehicle-mounted touch screen further includes a voice broadcast module for indicating the intermediate parameter value by voice feedback.

8. The vehicle-mounted touch screen of claim 5, wherein the shape of the parameter adjustment control comprises one or more of a circle with a complete circumference, a circle with an incomplete circumference, a ring with a complete circumference, and a ring with an incomplete circumference.

9. The vehicle-mounted touch screen of claim 5, wherein the vehicle-mounted touch screen further includes a voice broadcast module for indicating the final parameter value by voice feedback.

10. A system comprising:
a touch screen;
a processor; and
a memory storing instructions which, when executed by the processor, cause the processor to:
display a parameter adjustment control on the touch screen;
determine an initial touch position of an external touch operation when the parameter adjustment control on the touch screen detects the external touch operation;
calculate an initial angle value of a first angle formed by (i) a first line extending from a center of the parameter adjustment control to a preset reference point of the parameter adjustment control and (ii) a second line extending from the center of the parameter adjustment control to the initial touch position;
detect a movement trajectory and a final disengagement position of the external touch operation, wherein the movement trajectory is not limited to an area covered by the parameter adjustment control on the touch screen, and wherein the final disengagement position is a position before the external touch operation leaves the touch screen along the movement trajectory;
calculate a final angle value of a third angle formed by (i) a third line extending from the center of the parameter adjustment control to the final disengagement position and (ii) the first line;
determine a final parameter value for the parameter adjustment control based on the initial angle value, the final angle value, and the movement trajectory; and
adjust the parameter adjustment control to the final parameter value.

11. The system of claim 10, wherein the memory stores further instructions which, when executed by the processor, cause the processor to:
calculate an intermediate angle value of a second angle formed by (i) a fourth line extending from the center of the parameter adjustment control to a touch location on the movement trajectory and (ii) the first line; and
obtain an intermediate parameter value for the parameter adjustment control based on the initial angle value, the intermediate angle value, and the movement trajectory.

12. The system of claim 11, wherein the memory stores further instructions which, when executed by the processor, cause the processor to indicate the intermediate parameter value by voice feedback.

13. The system of claim 10, wherein the shape of the parameter adjustment control comprises one or more of a circle with a complete circumference, a circle with an incomplete circumference, a ring with a complete circumference, and a ring with an incomplete circumference.

14. The system of claim 10, wherein the memory stores further instructions which, when executed by the processor, cause the processor to indicate the final parameter value by voice feedback.

* * * * *